United States Patent
Miyamoto et al.

(10) Patent No.: US 11,926,233 B2
(45) Date of Patent: Mar. 12, 2024

(54) VEHICLE CONTROL DEVICE, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Yuma Miyamoto, Toyota (JP); Masahiro Takahashi, Toyota (JP); Akinori Kawamura, Okazaki (JP); Taisuke Hayashi, Miyoshi (JP); Takashi Fukai, Obu (JP); Kohki Ohkoshi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/453,015

(22) Filed: Nov. 1, 2021

(65) Prior Publication Data
US 2022/0153161 A1 May 19, 2022

(30) Foreign Application Priority Data

Nov. 13, 2020 (JP) .................................. 2020-189591

(51) Int. Cl.
*B60L 53/51* (2019.01)
*B60L 8/00* (2006.01)
(Continued)

(52) U.S. Cl.
CPC .............. *B60L 53/51* (2019.02); *B60L 8/003* (2013.01); *B60L 50/60* (2019.02); *B60L 53/62* (2019.02);
(Continued)

(58) Field of Classification Search
CPC .......... B60L 53/51; B60L 53/62; B60L 50/60; B60L 2240/547; B60L 2240/549;
(Continued)

(56) References Cited

U.S. PATENT DOCUMENTS

2010/0230292 A1* 9/2010 Kelly .................. H01M 8/0656
205/637
2012/0074892 A1* 3/2012 Wu ......................... B60L 8/003
320/101
(Continued)

FOREIGN PATENT DOCUMENTS

CN 105142960 A 12/2015
JP 2013-74733 A 4/2013
(Continued)

*Primary Examiner* — Richard Isla
*Assistant Examiner* — Johali A Torres Ruiz
(74) *Attorney, Agent, or Firm* — Oblon, McClelland, Maier & Neustadt, L.L.P.

(57) ABSTRACT

A vehicle control device configured to control supply of electric power generated by a solar panel mounted on a vehicle includes a supply destination setting unit configured to set, based on a condition of the vehicle, a target device that is a destination for the supply of the electric power generated by the solar panel, a target setting unit configured to set, depending on the target device set by the supply destination setting unit, target output electric power to be output from the solar panel to the target device, and a power controller configured to control the electric power to be supplied from the solar panel to the target device based on the target output electric power set by the target setting unit.

7 Claims, 4 Drawing Sheets

(51) Int. Cl.
 *B60L 50/60* (2019.01)
 *B60L 53/62* (2019.01)
 *H02J 7/35* (2006.01)

(52) U.S. Cl.
 CPC .......... *H02J 7/35* (2013.01); *B60L 2240/547* (2013.01); *B60L 2240/549* (2013.01)

(58) Field of Classification Search
 CPC ..... B60L 1/00; B60L 8/003; H02J 7/35; H02J 2300/26; Y02T 90/12
 See application file for complete search history.

(56) References Cited

U.S. PATENT DOCUMENTS

| | | | | |
|---|---|---|---|---|
| 2013/0241448 | A1* | 9/2013 | Yaoi | H01L 31/02008 |
| | | | | 136/244 |
| 2015/0291052 | A1* | 10/2015 | Nakazawa | B60R 16/03 |
| | | | | 320/101 |
| 2016/0075243 | A1* | 3/2016 | Okumura | H02J 7/16 |
| | | | | 318/139 |
| 2021/0155109 | A1 | 5/2021 | Miyamoto et al. | |

FOREIGN PATENT DOCUMENTS

| | | |
|---|---|---|
| JP | 2014-54119 A | 3/2014 |
| JP | 2014-206781 A | 10/2014 |
| JP | 2015-099447 A | 5/2015 |
| JP | 2015-133813 A | 7/2015 |
| JP | 2020-141545 A | 9/2020 |
| JP | 2021-083248 A | 5/2021 |

\* cited by examiner

[P-V CURVE]

VEHICLE CONTROL DEVICE, CONTROL METHOD, NON-TRANSITORY STORAGE MEDIUM, AND VEHICLE

CROSS-REFERENCE TO RELATED APPLICATION

This application claims priority to Japanese Patent Application No. 2020-189591 filed on Nov. 13, 2020, incorporated herein by reference in its entirety.

BACKGROUND

1. Technical Field

The present disclosure relates to a vehicle control device, a control method, a non-transitory storage medium, and a vehicle. For example, the vehicle control device is used for a vehicle configured such that supply of electric power generated by a solar panel mounted on the vehicle is controlled.

2. Description of Related Art

Japanese Unexamined Patent Application Publication No. 2015-099447 (JP 2015-099447 A) discloses a photovoltaic power generating system that can adjust output electric power of a solar panel by tracking a maximum power point (MPP) through scanning control even if the output electric power (P-V curve) has a plurality of peaks, for example, because the solar panel is partially shaded. Japanese Unexamined Patent Application Publication No. 2014-206781 (JP 2014-206781 A) discloses a photovoltaic power generating system that suppresses a decrease in power generation efficiency by tracking a maximum power point based on solar radiation distribution.

SUMMARY

In the photovoltaic power generating systems described in JP 2015-099447 A and JP 2014-206781 A, electric power at the maximum power point acquired by searching through the scanning control is set as target output electric power of the solar panel. For example, when the maximum electric power is supplied to a device connected as a power supply destination (target device) in a state in which the power consumption of the target device is small, the target device may malfunction or deteriorate along with excessive supply (excessive charging) of electric power.

The present disclosure provides a vehicle control device, a control method, a non-transitory storage medium, and a vehicle, in which target output electric power of a solar panel can be set to electric power suited to a target device connected as a power supply destination.

A first aspect of a technology of the present disclosure relates to a vehicle control device configured to control supply of electric power generated by a solar panel mounted on a vehicle. The vehicle control device includes a supply destination setting unit, a target setting unit, and a power controller. The supply destination setting unit is configured to set, based on a condition of the vehicle, a target device that is a destination for the supply of the electric power generated by the solar panel. The target setting unit is configured to set, depending on the target device set by the supply destination setting unit, target output electric power to be output from the solar panel to the target device. The power controller is configured to control the electric power to be supplied from the solar panel to the target device based on the target output electric power set by the target setting unit.

In the first aspect, the target device settable by the supply destination setting unit may include a first battery to be used for driving the vehicle, and a second battery that is not used for driving the vehicle. The target setting unit may be configured to switch the target output electric power to be set based on whether the supply destination setting unit sets the first battery as the target device.

In the first aspect, the target setting unit may be configured to, when the supply destination setting unit sets the first battery as the target device, set maximum electric power output by the solar panel as the target output electric power.

In the first aspect, the vehicle control device may include a searching unit configured to search for the maximum electric power output by the solar panel by scanning an output voltage of the solar panel within a movable range. The target setting unit may be configured to, when the supply destination setting unit sets the first battery as the target device, set the maximum electric power searched by the searching unit as the target output electric power.

In the first aspect, the target setting unit may be configured to, when the supply destination setting unit does not set the first battery as the target device, set electric power derived based on a voltage and a current of the second battery as the target output electric power.

A second aspect of the technology of the present disclosure relates to a vehicle. The vehicle includes a solar panel mounted on the vehicle, and a vehicle control device configured to control supply of electric power generated by the solar panel. The vehicle control device includes a supply destination setting unit, a target setting unit, and a power controller. The supply destination setting unit is configured to set, based on a condition of the vehicle, a target device that is a destination for the supply of the electric power generated by the solar panel. The target setting unit is configured to set, depending on the target device set by the supply destination setting unit, target output electric power to be output from the solar panel to the target device. The power controller is configured to control the electric power to be supplied from the solar panel to the target device based on the target output electric power set by the target setting unit.

In the second aspect, the target device settable by the supply destination setting unit may include a first battery to be used for driving the vehicle, and a second battery that is not used for driving the vehicle. The target setting unit may be configured to switch the target output electric power to be set based on whether the supply destination setting unit sets the first battery as the target device.

In the second aspect, the target setting unit may be configured to, when the supply destination setting unit sets the first battery as the target device, set maximum electric power output by the solar panel as the target output electric power.

In the second aspect, the vehicle control device may include a searching unit configured to search for the maximum electric power output by the solar panel by scanning an output voltage of the solar panel within a movable range. The target setting unit may be configured to, when the supply destination setting unit sets the first battery as the target device, set the maximum electric power searched by the searching unit as the target output electric power.

In the second aspect, the target setting unit may be configured to, when the supply destination setting unit does not set the first battery as the target device, set electric power derived based on a voltage and a current of the second battery as the target output electric power.

A third aspect of the technology of the present disclosure relates to a control method for power supply to be executed by a computer of a vehicle control device configured to control supply of electric power generated by a solar panel mounted on a vehicle. The control method includes a step of setting, based on a condition of the vehicle, a target device that is a destination of the supply of the electric power generated by the solar panel, a step of setting, depending on the set target device, target output electric power to be output from the solar panel to the target device, and a step of controlling the electric power to be supplied from the solar panel to the target device based on the set target output electric power.

A fourth aspect of the technology of the present disclosure relates to a non-transitory storage medium storing instructions that are executable by one or more processors of a computer of a vehicle control device configured to control supply of electric power generated by a solar panel mounted on a vehicle and that cause the one or more processors to perform the following steps. The steps include a step of setting, based on a condition of the vehicle, a target device that is a destination of the supply of the electric power generated by the solar panel, a step of setting, depending on the set target device, target output electric power to be output from the solar panel to the target device, and a step of controlling the electric power to be supplied from the solar panel to the target device based on the set target output electric power.

According to the first aspect, the second aspect, the third aspect, and the fourth aspect of the present disclosure, the target output electric power of the solar panel can be set to the electric power suited to the target device connected as the power supply destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an on-board photovoltaic power generating system including at least a solar panel, a drive battery, and an auxiliary device battery, a vehicle control device of the present disclosure sets electric power to be supplied from the solar panel to a target device to be supplied with electric power from the solar panel depending on whether the drive battery is set as the target device. Thus, target output electric power of the solar panel can be set to electric power suited to the target device connected as a power supply destination.

An embodiment of the present disclosure is described below in detail with reference to the drawings.

Embodiment

Configuration

Figure 1:
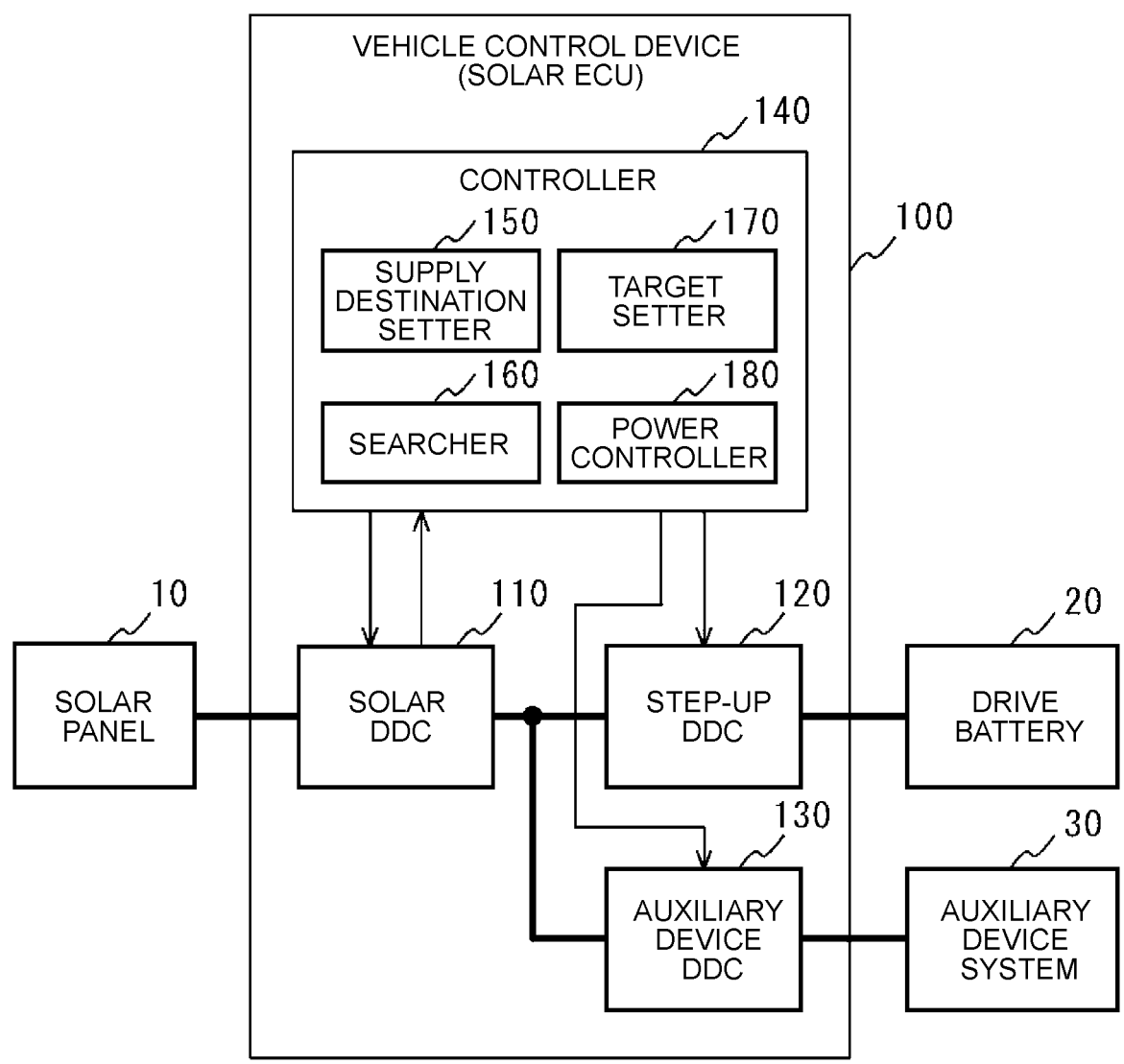
FIG. 1 is a functional block diagram of a vehicle control device and its periphery according to one embodiment.

FIG. 1 is a functional block diagram of a vehicle control device 100 and its periphery according to one embodiment of the present disclosure. Functional blocks exemplified in FIG. 1 include a solar panel 10, a drive battery 20, an auxiliary device system 30, and the vehicle control device 100. In FIG. 1, wiring for transmitting electric power is represented by wide continuous lines, and wiring for transmitting, for example, control signals instead of electric power is represented by narrow arrow lines.

The solar panel 10 is a photovoltaic cell module that is an aggregate of photovoltaic cells that generate electric power by receiving sunlight radiation. The amount of electric power generated by the solar panel 10 depends on solar radiation intensity. The electric power generated by the solar panel 10 is output to the vehicle control device 100. For example, the solar panel 10 can be mounted on a roof of a vehicle.

The drive battery 20 is a chargeable and dischargeable secondary battery such as a lithium ion battery. Examples of the drive battery 20 include a battery (first battery) for supplying electric power to a so-called main device (not illustrated) to be used for driving the vehicle, such as an electric motor for traveling. The drive battery 20 can store electric power generated by the solar panel 10 and supplied via the vehicle control device 100.

The auxiliary device system 30 includes so-called auxiliary devices other than the main device and a battery (second battery) for supplying electric power to the auxiliary devices (not illustrated). Examples of the second battery include an auxiliary device battery that is not used for driving the vehicle. For example, the auxiliary device is an air conditioner, a lighting device, or other on-board devices. The auxiliary device battery is a chargeable and dischargeable secondary battery such as a lead acid battery or a lithium ion battery, and can store electric power generated by the solar panel 10 and supplied via the vehicle control device 100.

The vehicle control device 100 is an electronic control unit (ECU), specifically, a so-called solar ECU that electrically connects the solar panel 10 to the drive battery 20 and the auxiliary device system 30 and supplies electric power generated by the solar panel 10 to a target device that is a power supply destination. The vehicle control device 100 typically includes a processor, a memory, and an input/output interface. The processor reads and executes programs stored in the memory to achieve various types of control. The vehicle control device 100 according to this embodiment includes a solar direct current-to-direct current (DC/DC) converter (hereinafter referred to as "solar DDC") 110, a step-up DC/DC converter (hereinafter referred to as "step-up DDC") 120, an auxiliary device DC/DC converter (hereinafter referred to as "auxiliary device DDC") 130, and a controller 140.

The solar DDC 110 is connected between the solar panel 10 and each of the step-up DDC 120 and the auxiliary device DDC 130. The solar DDC 110 supplies electric power generated by the solar panel 10 to the step-up DDC 120 and the auxiliary device DDC 130 based on instructions from the controller 140 described later. When supplying electric power, the solar DDC 110 can output an output voltage of the solar panel 10 that is an input voltage of the solar DDC 110 by converting (stepping up or down) the output voltage into a voltage that is based on an instruction from the controller 140.

The step-up DDC 120 is connected between the solar DDC 110 and the drive battery 20. The step-up DDC 120 supplies electric power output from the solar DDC 110 to the drive battery 20 based on an instruction from the controller 140. When supplying electric power, the step-up DDC 120 can output an output voltage of the solar DDC 110 that is an input voltage of the step-up DDC 120 by converting (stepping up) the output voltage into a voltage that is based on an instruction from the controller 140.

The auxiliary device DDC 130 is connected between the solar DDC 110 and the auxiliary device system 30. The auxiliary device DDC 130 supplies electric power output from the solar DDC 110 to the auxiliary device system 30 based on an instruction from the controller 140. When supplying electric power, the auxiliary device DDC 130 can output an output voltage of the solar DDC 110 that is an input voltage of the auxiliary device DDC 130 by converting (stepping down) the output voltage into a voltage that is based on an instruction from the controller 140.

For example, the controller 140 is a microcomputer, and can control operations of the solar DDC 110, the step-up DDC 120, and the auxiliary device DDC 130 depending on the target device that is a destination of supply of electric power generated by the solar panel 10 and is set based on conditions of the vehicle. The controller 140 includes a supply destination setting unit 150, a searching unit 160, a target setting unit 170, and a power controller 180.

The supply destination setting unit 150 can set the target device that is a destination of supply of electric power generated by the solar panel 10 based on conditions of the vehicle. In this embodiment, the drive battery 20 and the auxiliary device system 30 may be the target devices settable by the supply destination setting unit 150. Examples of the conditions of the vehicle include a traveling status of the vehicle (traveling or parked) and conditions of power consumption of the auxiliary device system 30 (current consumption of the auxiliary devices and a voltage and a power storage amount of the auxiliary device battery). The supply destination setting unit 150 can set either one or both of the drive battery 20 and the auxiliary device system 30 as the target device. For example, the target device can be set assuming such usage that the electric power generated by the solar panel 10 is used for charging the drive battery 20 while the vehicle is parked and is consumed by the auxiliary device system 30 while the vehicle is traveling. The target device can be set by appropriately controlling the step-up DDC 120 and the auxiliary device DDC 130.

The searching unit 160 can execute so-called scanning control by scanning an output voltage of the solar panel 10 within a movable range of a voltage instruction value of the solar DDC 110 and moving a control point of the solar panel 10 to search for a maximum power point at which maximum electric power is output by the solar panel 10. Examples of the scanning control include such control that the control point of the solar panel 10 is temporarily moved to a low-voltage side (preparatory scanning operation) and then electric power generated by the solar panel 10 is measured and stored each time while moving the control point from the low-voltage side to a high-voltage side (full scanning operation).

Depending on the target device set by the supply destination setting unit 150, the target setting unit 170 sets target output electric power to be output from the solar panel 10 to the target device. More specifically, the target setting unit 170 switches the target output electric power to be set depending on whether the drive battery 20 (first battery) is set as the target device. A method for setting the target output electric power is described later.

Based on the target output electric power set by the target setting unit 170, the power controller 180 controls electric power to be supplied from the solar panel 10 to the target device set by the supply destination setting unit 150. This control can be achieved by appropriately controlling the voltage instruction value of the solar DDC 110.

Control

Figure 2:
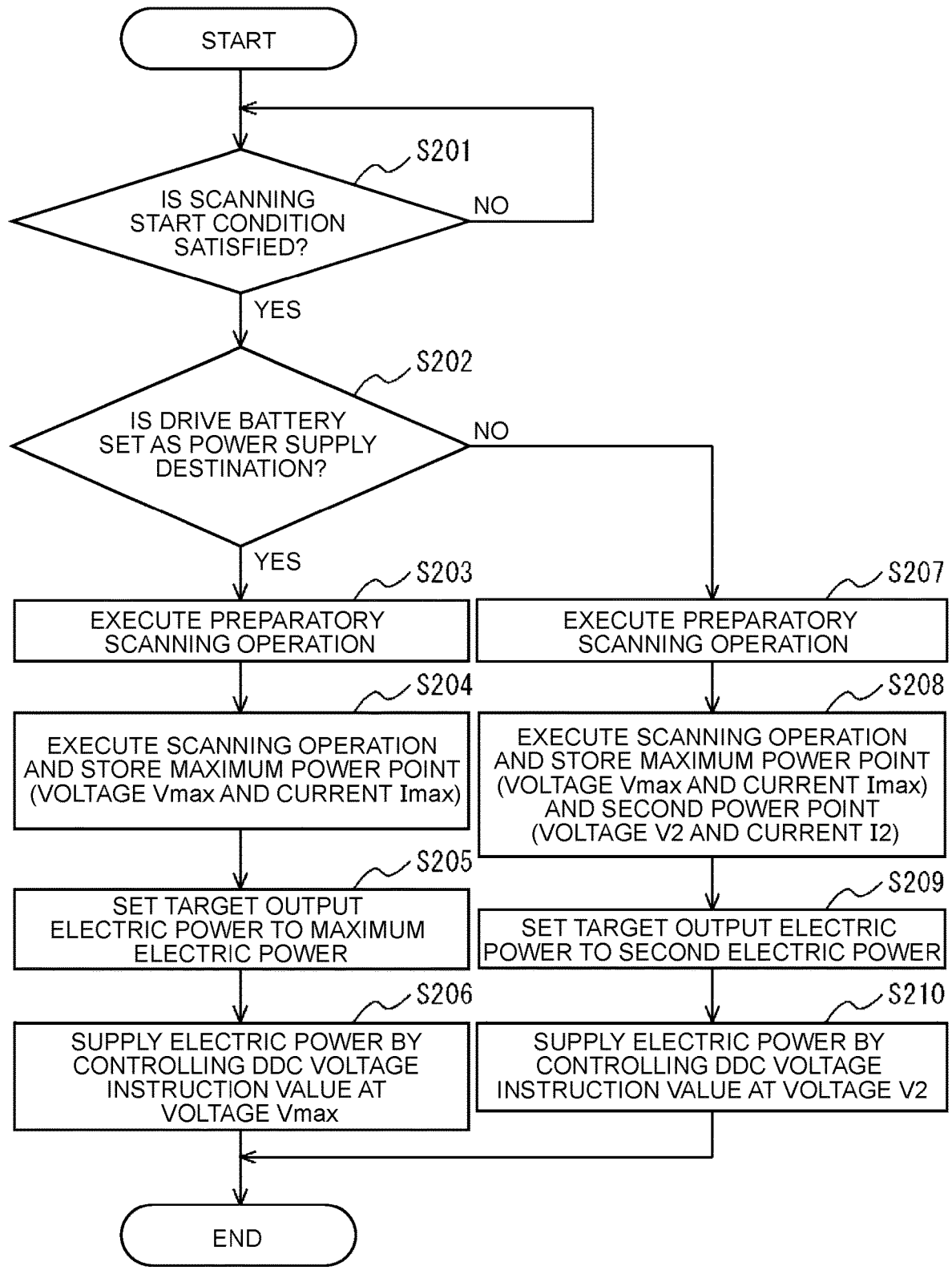
FIG. 2 is a flowchart for describing a processing procedure of power supply control to be executed by a controller of the vehicle control device.
Figure 3:
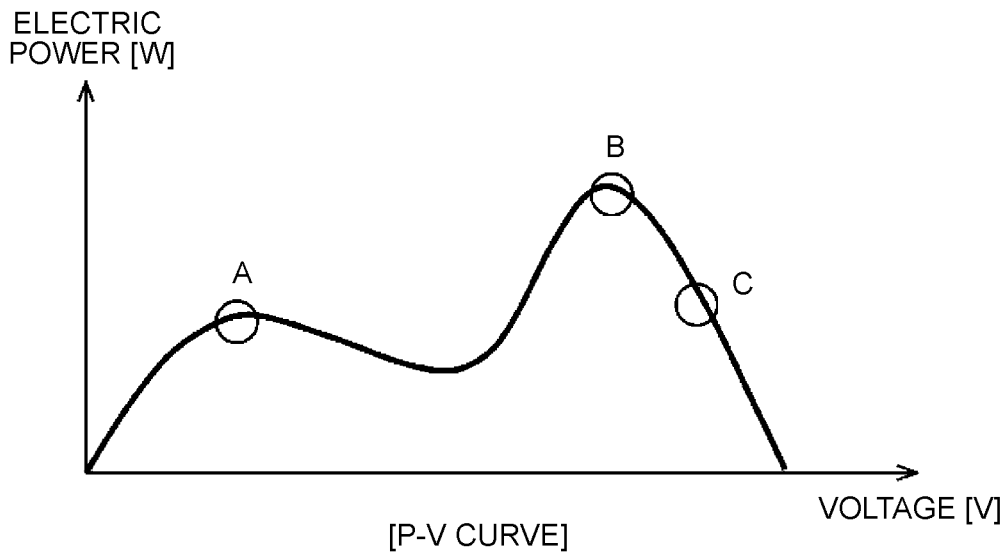
FIG. 3 is a diagram illustrating an example of a P-V curve of a solar panel.
Figure 4:
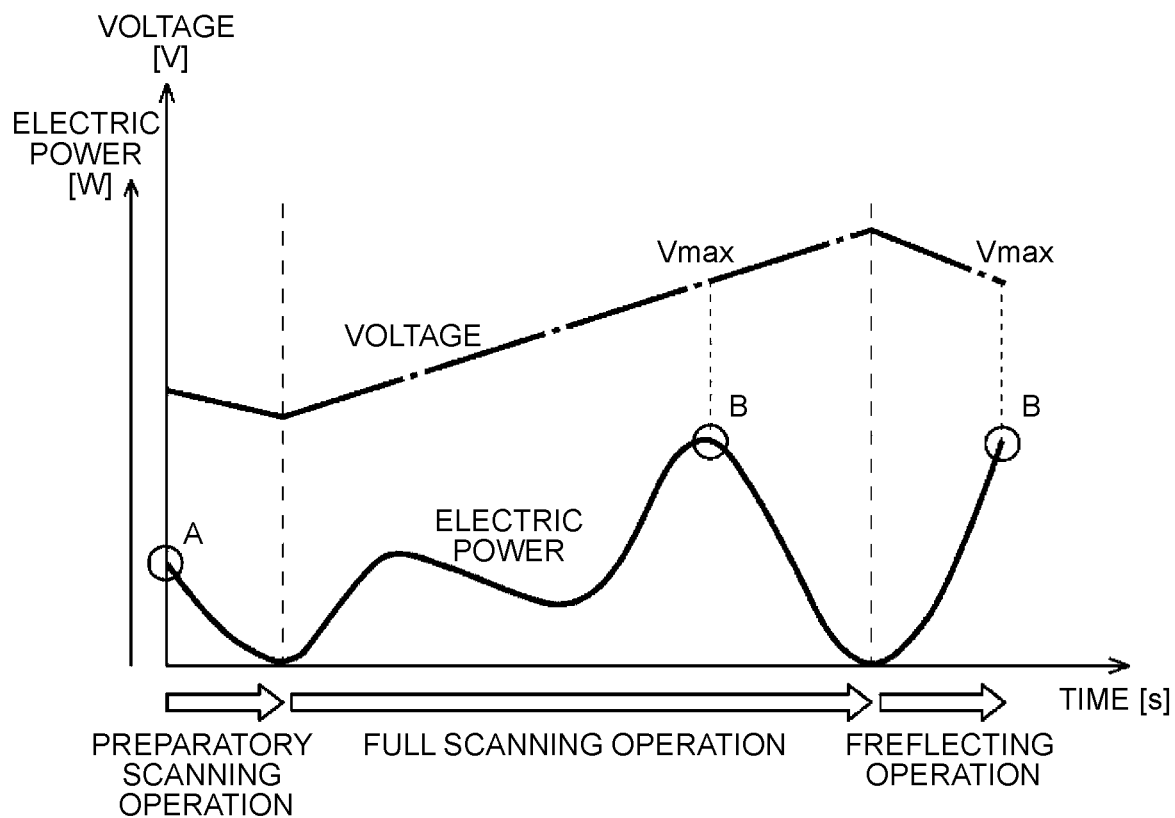
FIG. 4 is a diagram for describing an example of scanning control to be executed by a searching unit.
Figure 5:
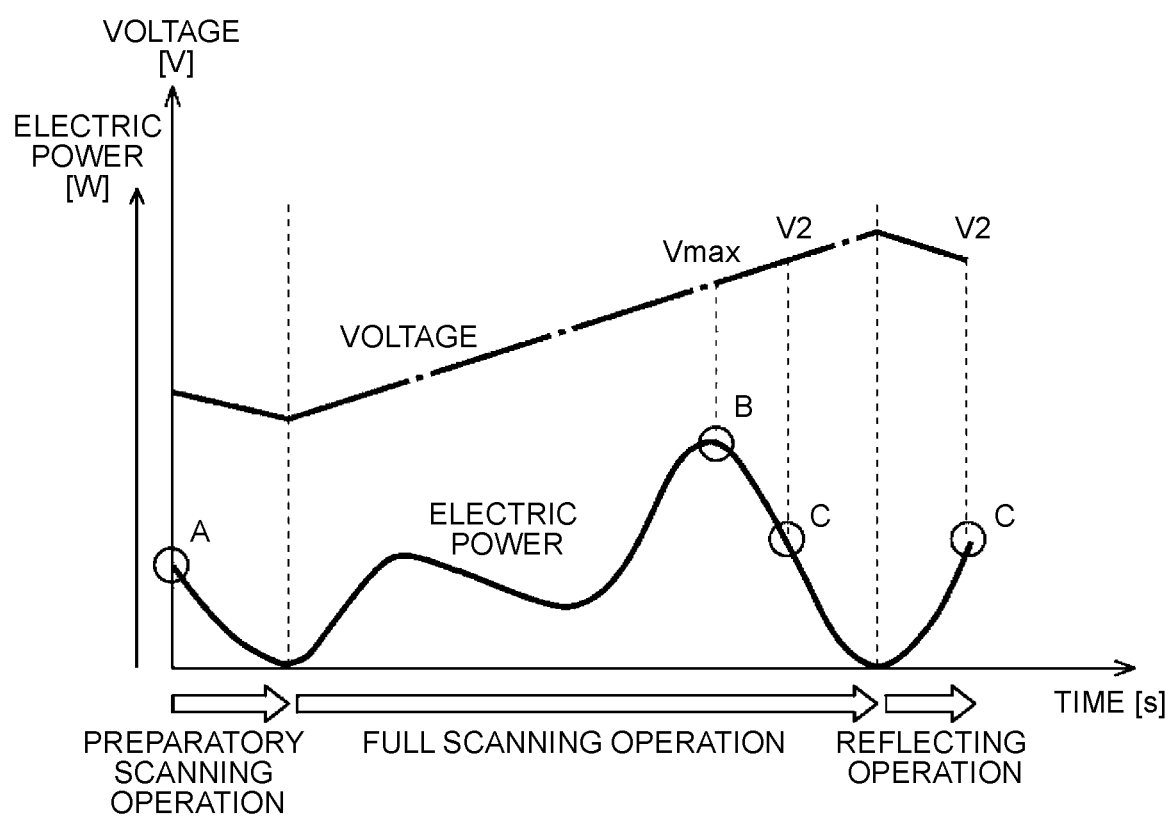
FIG. 5 is a diagram for describing an example of the scanning control to be executed by the searching unit.

Next, power supply control to be executed by the vehicle control device 100 according to the embodiment of the present disclosure is described with reference to FIG. 2 to FIG. 5 as well. FIG. 2 is a flowchart for describing a processing procedure of the power supply control to be executed by the controller 140 of the vehicle control device 100. FIG. 3 is a diagram illustrating an example of a P-V curve of the solar panel 10. FIG. 4 and FIG. 5 are diagrams for describing examples of scanning control to be executed by the searching unit 160.

The power supply control illustrated in FIG. 2 is started when the solar DDC 110 is activated and an on-board photovoltaic power generating system including the solar panel 10, the drive battery 20, the auxiliary device system 30, and the vehicle control device 100 is operated, and is repeated until the on-board photovoltaic power generating system is stopped.

Step S201

The searching unit 160 determines whether a predetermined scanning start condition is satisfied. The scanning start condition is a predetermined condition for determining the start of execution of the scanning control. Examples of the scanning start condition include a condition that a first period has elapsed from previous scanning control, and a condition that the solar panel 10 has generated first electric power. For example, the first period can be set to a predetermined period to determine that the maximum power point of the solar panel 10 needs to be checked again. For example, the first electric power can be set to predetermined electric power determined as being able to supply electric power efficiently to the drive battery 20 or the auxiliary device system 30. When the scanning start condition is satisfied (S201: YES), the process proceeds to Step S202. When the scanning start condition is not satisfied (S201: NO), the determination is repeated until the scanning start condition is satisfied.

Step S202

The supply destination setting unit 150 determines whether the drive battery 20 is set as the target device that is a destination of supply of electric power generated by the solar panel 10. In this determination, at least the drive battery 20 may be set, and the auxiliary device system 30 may be set as well as the drive battery 20. When the drive battery 20 is set as the target device (S202: YES), the process proceeds to Step S203. When the drive battery 20 is not set as the target device (S202: NO), the process proceeds to Step S207.

Step S203

The searching unit 160 executes the preparatory scanning operation. In the preparatory scanning operation, a current control point A of the solar panel 10 is moved to the low-voltage side as illustrated in FIG. 4. When the preparatory scanning operation is executed, the process proceeds to Step S204.

Step S204

The searching unit 160 executes the full scanning operation. In the full scanning operation, the control point of the solar panel 10 is moved from the low-voltage side to the high-voltage side as illustrated in FIG. 4. The searching unit 160 stores a voltage Vmax and a current Imax at a maximum power point B at which maximum electric power is generated by the solar panel 10. For example, information on the maximum power point B (voltage Vmax and current Imax) is stored in a storage (not illustrated) of the vehicle control device 100. When the information on the maximum power point B is stored, the process proceeds to Step S205.

Step S205

Since the drive battery 20 is set as the target device, the target setting unit 170 sets electric power at the maximum power point B of the solar panel 10, that is, the maximum electric power generable by the solar panel 10 as the target output electric power (in other words, switches the target output electric power from second electric power (described later) to the maximum electric power). When the target output electric power is set to the maximum electric power, the process proceeds to Step S206.

Step S206

The power controller 180 controls the voltage instruction value of the solar DDC 110 at a voltage for generating the maximum electric power set as the target output electric power, that is, the voltage Vmax at the maximum power point B. As illustrated in FIG. 4, the control point of the solar panel 10 is moved to the maximum power point B (reflecting operation), and electric power is supplied from the solar panel 10 to the target device including the drive battery 20. When electric power is supplied based on the target output electric power, the power supply control is terminated.

Step S207

The searching unit 160 executes the preparatory scanning operation. In the preparatory scanning operation, the current control point A of the solar panel 10 is moved to the low-voltage side as illustrated in FIG. 5. When the preparatory scanning operation is executed, the process proceeds to Step S208.

Step S208

The searching unit 160 executes the full scanning operation. In the full scanning operation, the control point of the solar panel 10 is moved from the low-voltage side to the high-voltage side as illustrated in FIG. 5. The searching unit 160 stores the voltage Vmax and the current Imax at the maximum power point B at which the maximum electric power is generated by the solar panel 10, and a voltage V2 and a current I2 at a second power point C at which the preset second electric power is generated. The second electric power is electric power to be supplied to the auxiliary device system 30, and is set to electric power derived by a predetermined system or the ECU based on a voltage and input and output currents of the auxiliary device battery. The second electric power is desirably equal to or larger than the first electric power serving as the scanning start condition. Thus, it is possible to suppress executing the scanning control even though solar radiation is not sufficient to generate the second electric power. The input and output currents of the auxiliary device battery fluctuate depending on, for example, the types, numbers, temperature conditions, and ages of the auxiliary devices that acquire electric power from the auxiliary device battery. For example, information on the maximum power point B (voltage Vmax and current Imax) and information on the second power point C (voltage V2 and current I2) are stored in the storage (not illustrated) of the vehicle control device 100. When the information on the maximum power point and the information on the second power point C are stored, the process proceeds to Step S209.

Step S209

Since the drive battery 20 is not set as the target device, the target setting unit 170 sets electric power at the second power point C of the solar panel 10, that is, the second electric power as the target output electric power (in other words, switches the target output electric power from the maximum electric power to the second electric power). When the target output electric power is set to the second electric power, the process proceeds to Step S210.

Step S210

The power controller 180 controls the voltage instruction value of the solar DDC 110 at a voltage for generating the second electric power set as the target output electric power, that is, the voltage V2 at the second power point C. As illustrated in FIG. 5, the control point of the solar panel 10 is moved to the second power point C (reflecting operation), and electric power is supplied from the solar panel 10 to the target device that does not include the drive battery 20. When electric power is supplied based on the target output electric power, the power supply control is terminated.

In the power supply control, the maximum electric power generable by the solar panel 10 is supplied to the target device when the drive battery 20 is set as the target device, and the second electric power determined based on, for example, a demand for the auxiliary device system 30 is supplied to the target device when the drive battery 20 is not set as the target device. Thus, the target output electric power of the solar panel 10 can be set to the electric power suited to the target device connected as the power supply destination (such as the drive battery 20 or the auxiliary device system 30).

The target device set as the power supply destination by the supply destination setting unit 150 may be changed based on the electric power at the maximum power point B acquired by searching through the scanning control executed in Steps S203 and S204 or in Steps S207 and S208. For example, the information on the maximum power point as well as the information on the second power point C is stored in Step S208. Therefore, when the electric power at the maximum power point B increases enough to charge the drive battery 20 while the second electric power is being supplied to the auxiliary device system 30, the drive battery 20 can be connected and supplied with the maximum electric power. With this operation, the electric power generated by the solar panel 10 can be used efficiently.

ACTIONS AND EFFECTS

As described above, the vehicle control device 100 according to the embodiment of the present disclosure executes the control for changing the setting of the target output electric power to be supplied from the solar panel 10 to the target device depending on whether the drive battery 20 is set as the target device to be supplied with electric power from the solar panel 10.

Through this control, the target output electric power of the solar panel can be set to the electric power suited to the target device connected as the power supply destination. Thus, it is possible to restrain malfunction or deterioration in the target device along with excessive supply (excessive charging) of electric power that is caused by, for example, supplying the maximum electric power to the target device in a state in which the power consumption of the target device is small.

Although the embodiment of the present disclosure is described above, the present disclosure can be regarded as the vehicle control device, a power supply control method to be executed by the vehicle control device including the processor and the memory, a control program for executing the power supply control method, a non-transitory computer-readable storage medium storing the control program, or a vehicle including the vehicle control device.

The vehicle control device of the present disclosure is applicable to, for example, a vehicle including a solar panel configured to execute photovoltaic power generation.

What is claimed is:

1. A vehicle control device configured to control supply of electric power generated by a solar panel mounted on a vehicle, the vehicle control device comprising:
    a supply destination setting circuit configured to set, based on a condition of the vehicle, a target device that is a destination for the supply of the electric power generated by the solar panel;
    a target setting circuit configured to set, depending on the target device set by the supply destination setting circuit, target output electric power to be output from the solar panel to the target device, wherein the target device settable by the supply destination setting circuit includes a first battery to be used for driving the vehicle, and a second battery that is not used for driving the vehicle, and the target setting circuit is configured to switch the target output electric power to be set based on whether the supply destination setting circuit sets the first battery as the target device, and, when the supply destination setting circuit sets the first battery as the target device, set maximum electric power output by the solar panel as the target output electric power;
    a power controller configured to control the electric power to be supplied from the solar panel to the target device based on the target output electric power set by the target setting circuit; and
    a searching circuit configured to search for the maximum electric power output by the solar panel by scanning an output voltage of the solar panel within a movable range, wherein the target setting circuit is configured to, when the supply destination setting circuit sets the first battery as the target device, set the maximum electric power searched by the searching circuit as the target output electric power.

2. The vehicle control device according to claim 1, wherein the target setting circuit is configured to, when the supply destination setting circuit does not set the first battery as the target device, set electric power derived based on a voltage and a current of the second battery as the target output electric power.

3. The vehicle control device according to claim 1, wherein scanning the output voltage of the solar panel includes measuring the electric power generated by the solar panel at various control points that are varied from a low-voltage side to a high-voltage side.

4. A vehicle comprising:
    a solar panel mounted on the vehicle; and
    a vehicle control device configured to control supply of electric power generated by the solar panel, wherein the vehicle control device includes:
        a supply destination setting circuit configured to set, based on a condition of the vehicle, a target device that is a destination for the supply of the electric power generated by the solar panel;
        a target setting circuit configured to set, depending on the target device set by the supply destination setting circuit, target output electric power to be output from the solar panel to the target device, wherein the target device settable by the supply destination setting circuit includes a first battery to be used for driving the vehicle, and a second battery that is not used for driving the vehicle, and the target setting circuit is configured to switch the target output electric power to be set based on whether the supply destination setting circuit sets the first battery as the target device, and, when the supply destination setting circuit sets the first battery as the target device, set maximum electric power output by the solar panel as the target output electric power;
        a power controller configured to control the electric power to be supplied from the solar panel to the target device based on the target output electric power set by the target setting circuit; and
        a searching circuit configured to search for the maximum electric power output by the solar panel by scanning an output voltage of the solar panel within a movable range, and the target setting circuit is configured to, when the supply destination setting circuit sets the first battery as the target device, set the maximum electric power searched by the searching circuit as the target output electric power.

5. The vehicle according to claim 4, wherein the target setting circuit is configured to, when the supply destination setting circuit does not set the first battery as the target device, set electric power derived based on a voltage and a current of the second battery as the target output electric power.

6. A control method for power supply to be executed by a computer of a vehicle control device configured to control supply of electric power generated by a solar panel mounted on a vehicle, the control method comprising:
    a step of setting, based on a condition of the vehicle, a target device that is a destination of the supply of the electric power generated by the solar panel;
    a step of setting, depending on the set target device, target output electric power to be output from the solar panel to the target device, wherein the target device includes a first battery to be used for driving the vehicle and a second battery that is not used for driving the vehicle, and the target output electric power to be set is switched based on whether the first battery is set as the target device, and, when the first battery is set as the target device, maximum electric power output by the solar panel is set as the target output electric power;
    a step of controlling the electric power to be supplied from the solar panel to the target device based on the set target output electric power; and
    a step of searching for the maximum electric power output by the solar panel by scanning an output voltage of the solar panel within a movable range, wherein, when the first battery is set as the target device, the maximum electric power is set as the target output electric power.

7. A non-transitory storage medium storing instructions that are executable by one or more processors of a computer of a vehicle control device configured to control supply of electric power generated by a solar panel mounted on a vehicle and that cause the one or more processors to perform steps comprising:
    a step of setting, based on a condition of the vehicle, a target device that is a destination of the supply of the electric power generated by the solar panel;
    a step of setting, depending on the set target device, target output electric power to be output from the solar panel to the target device, wherein the target device includes a first battery to be used for driving the vehicle and a second battery that is not used for driving the vehicle, and the target output electric power to be set is switched based on whether the first battery is set as the target device, and, when the first battery is set as the target device, maximum electric power output by the solar panel is set as the target output electric power;

a step of controlling the electric power to be supplied from the solar panel to the target device based on the set target output electric power; and a step of searching for the maximum electric power output by the solar panel by scanning an output voltage of the solar panel within a movable range, wherein, when the first battery is set as the target device, the maximum electric power is set as the target output electric power.

* * * * *